(12) United States Patent
Tusinean et al.

(10) Patent No.: US 8,844,494 B2
(45) Date of Patent: Sep. 30, 2014

(54) PULLROD CONNECTION TO A JOURNAL

(75) Inventors: Adrian Tusinean, Windsor (CA); Peter Hofbauer, West Bloomfield, MI (US)

(73) Assignee: EcoMotors, Inc., Allen Park, MI (US)

( * ) Notice: Subject to any disclaimer, the term of this patent is extended or adjusted under 35 U.S.C. 154(b) by 414 days.

(21) Appl. No.: 13/365,558

(22) Filed: Feb. 3, 2012

(65) Prior Publication Data

US 2012/0207415 A1   Aug. 16, 2012

Related U.S. Application Data

(60) Provisional application No. 61/441,915, filed on Feb. 11, 2011.

(51) Int. Cl.
| | |
|---|---|
| F02B 75/32 | (2006.01) |
| F16C 7/00 | (2006.01) |
| F16C 7/02 | (2006.01) |
| F16C 9/04 | (2006.01) |
| F16J 7/00 | (2006.01) |
| F02B 75/02 | (2006.01) |
| F16J 1/14 | (2006.01) |

(52) U.S. Cl.
CPC . F16J 7/00 (2013.01); F16C 7/023 (2013.01); F02B 2075/025 (2013.01); F16J 1/14 (2013.01); F16C 9/04 (2013.01); F02B 75/32 (2013.01)
USPC .................................................. 123/197.3

(58) Field of Classification Search
CPC ............ F16C 7/023; F16C 9/04; F02B 75/32; F02B 2075/025; F16J 1/14
USPC ........................................................ 123/197.3
See application file for complete search history.

(56) References Cited

U.S. PATENT DOCUMENTS

| | | | |
|---|---|---|---|
| 1,286,852 A | 12/1918 | Watson | |
| 1,322,824 A | 11/1919 | Royce | |
| 3,069,926 A * | 12/1962 | Hoffman et al. | ................. 74/580 |
| 3,241,896 A | 3/1966 | Pinkerton | |
| 2008/0190699 A1* | 8/2008 | Ohta | ............................... 184/6.5 |
| 2009/0044779 A1* | 2/2009 | Solfrank | .................... 123/192.2 |
| 2009/0139476 A1* | 6/2009 | Hofbauer et al. | ............ 123/55.2 |

FOREIGN PATENT DOCUMENTS

| | | |
|---|---|---|
| EP | 1431617 A1 | 6/2004 |
| GB | 2484573 A | 4/2012 |

\* cited by examiner

*Primary Examiner* — Lindsay Low
*Assistant Examiner* — Charles Brauch
(74) *Attorney, Agent, or Firm* — Diana D. Brehob

(57) ABSTRACT

Reciprocating motion can be converted to rotary motion through a crankshaft and a connecting rod. In a connecting rod that is primarily in tension, two opposing connecting rods can be coupled to a single journal. Two bearing caps are placed over the journal, the bearing caps having fingers that extend away from the bearing cap with the fingers of the two bearing caps being enmeshed. Fingers of each bearing cap are coupled to the connecting rods. The resulting joint is compact and lighter weight with a shorter journal than prior joints.

47 Claims, 10 Drawing Sheets

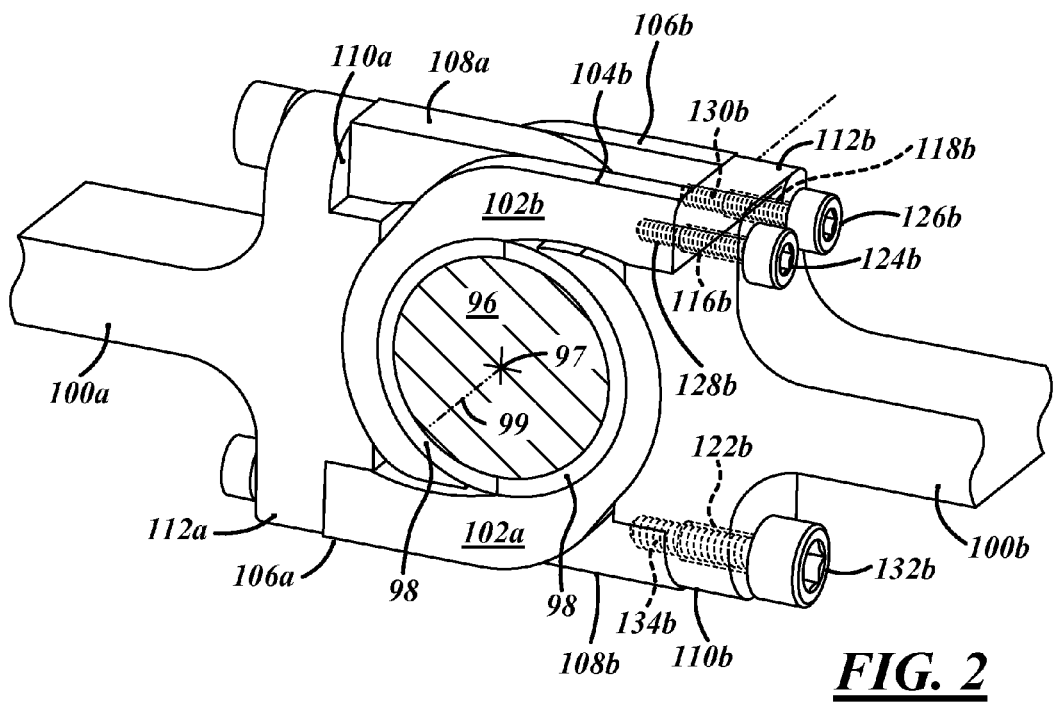
FIG. 2
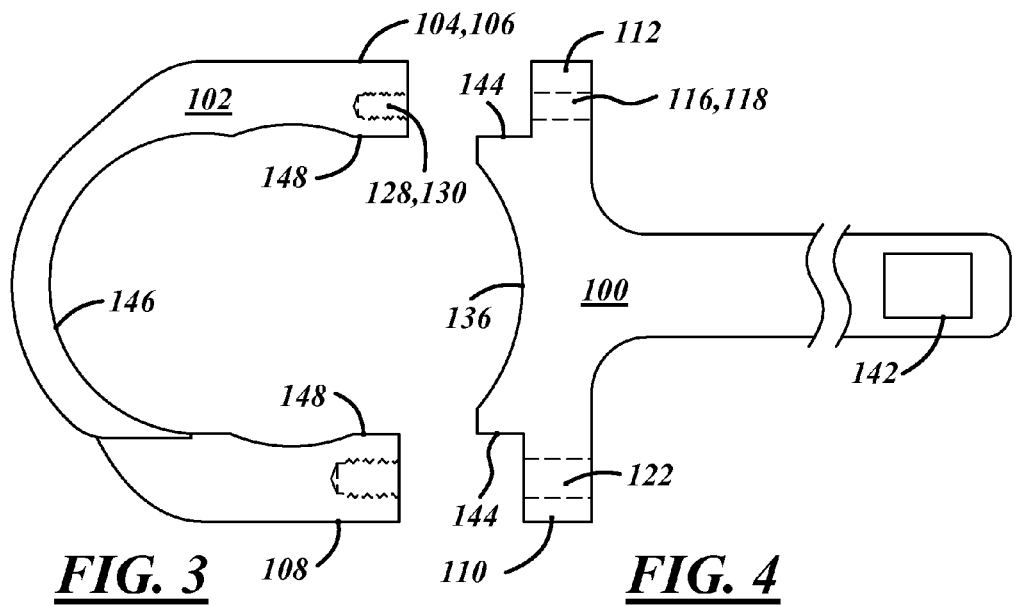
FIG. 3  FIG. 4

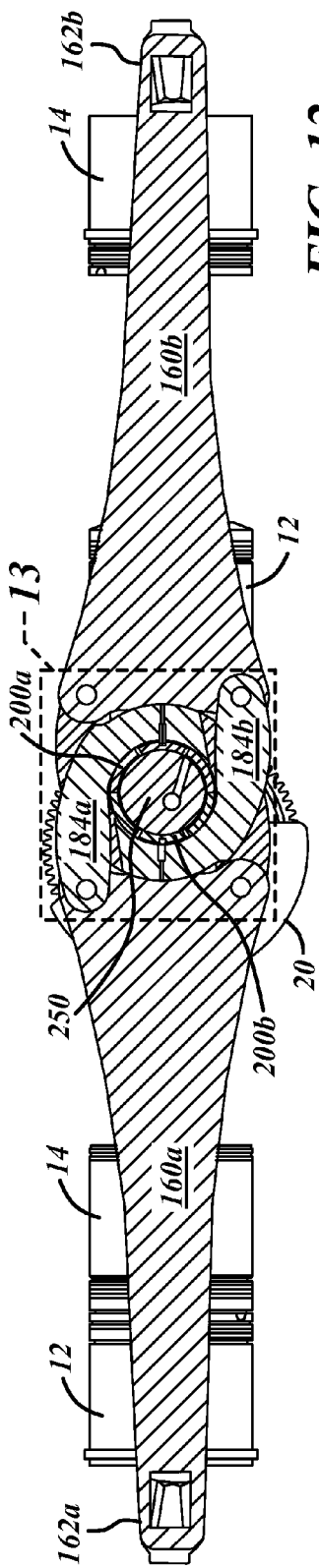
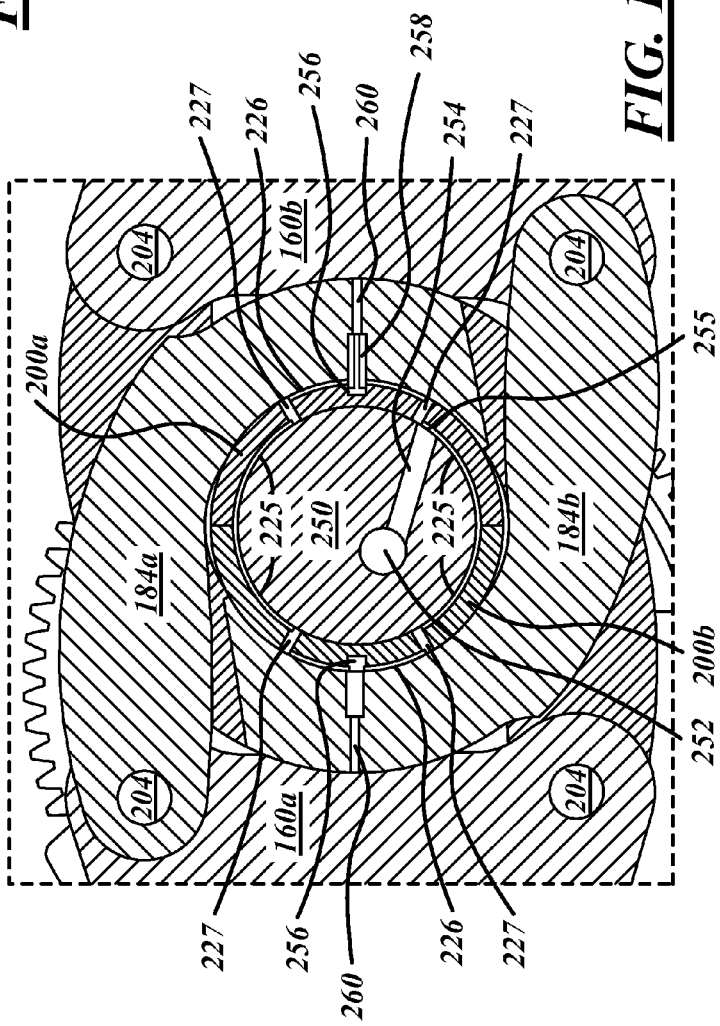
FIG. 12
FIG. 13

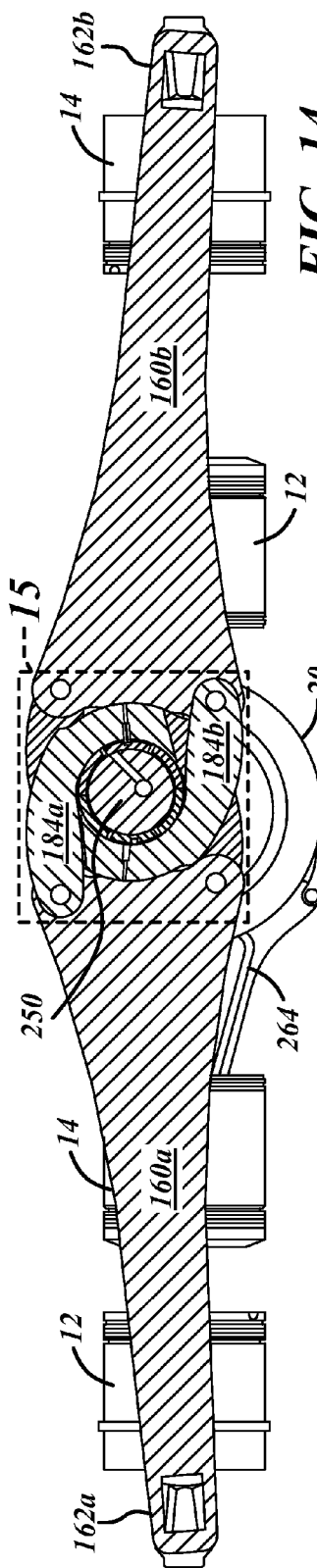
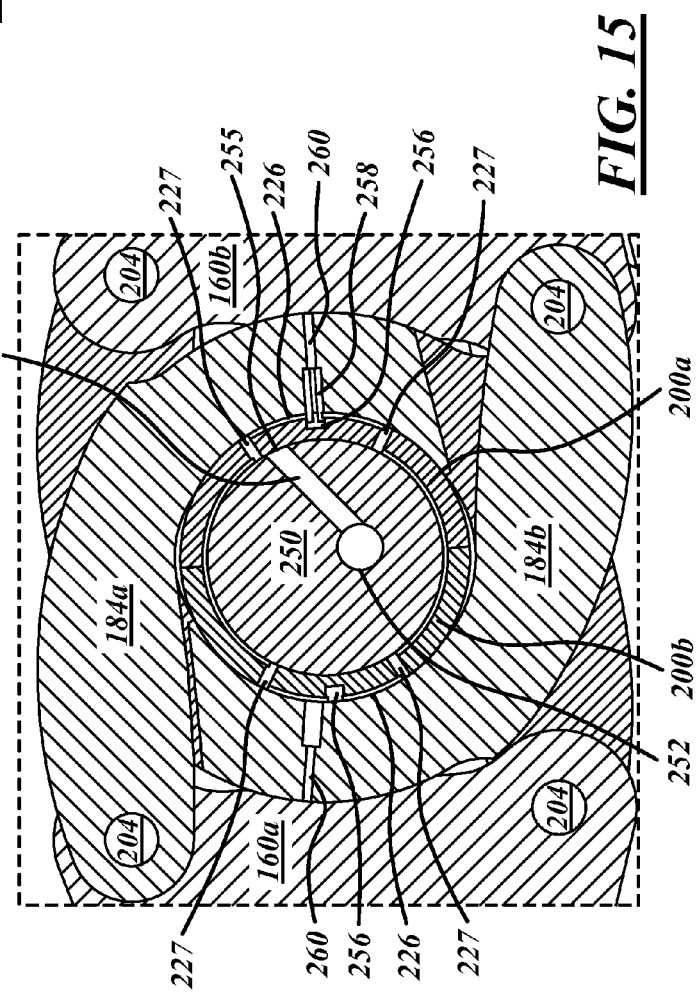
FIG. 14
FIG. 15

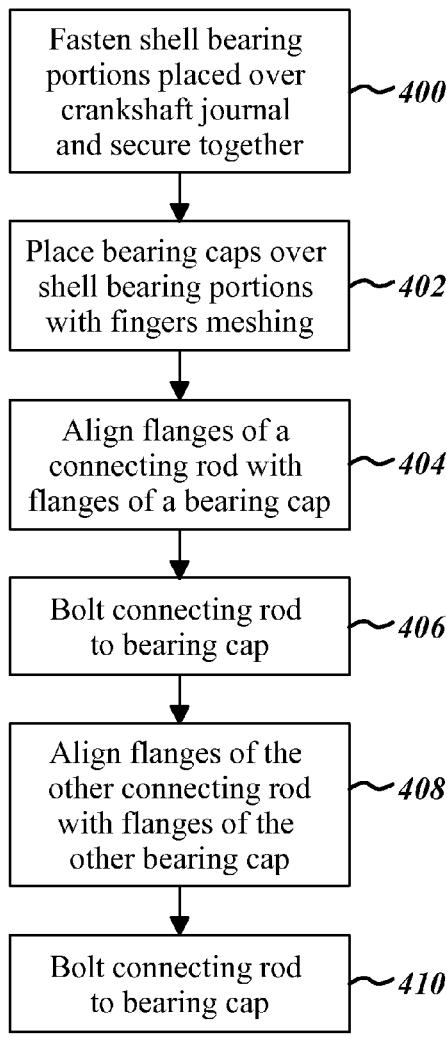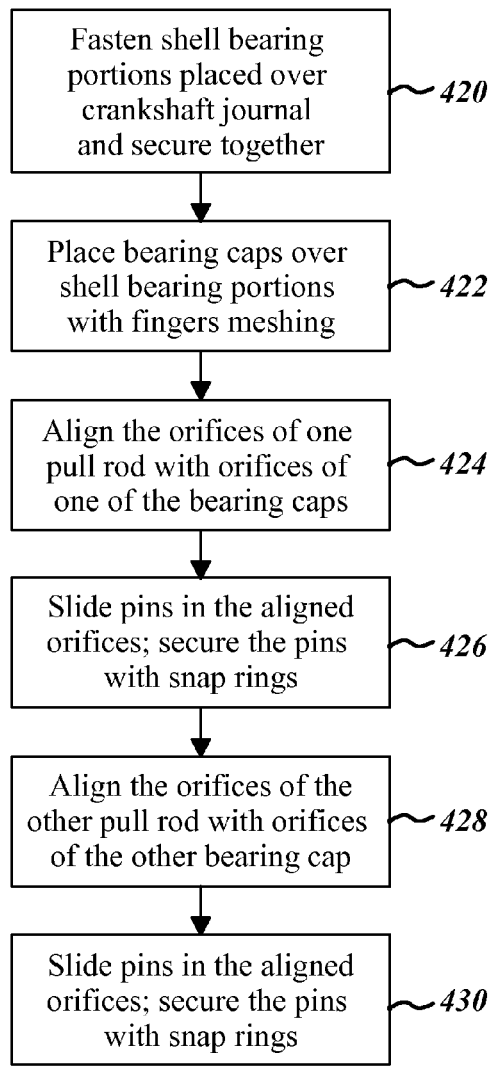
*FIG. 19*
*FIG. 20*

PULLROD CONNECTION TO A JOURNAL

CROSS REFERENCE TO RELATED APPLICATIONS

The present application claims priority benefit from U.S. provisional patent application 61/441,915 filed 11 Feb. 2011.

FIELD

The present disclosure relates to a pullrod connection to a journal of a rotating member.

BACKGROUND

In FIG. 1, an opposed-piston, opposed-cylinder (OPOC) engine 10 is shown isometrically. An intake piston 12 and an exhaust piston 14 reciprocate within each of first and second cylinders (cylinders not shown to facilitate viewing pistons). Exhaust pistons 14 couple with a journal (not visible) of crankshaft 20 via pushrods 16. Intake pistons 12 couple with two journals (not visible) of crankshaft 20 via pullrods 18, with each intake piston 12 having two pullrods 18. The first and second cylinders in which the pistons reciprocate are parallel but offset from each other in the Y direction due to pullrods 18 associated with the cylinder shown front and leftward displaced in a negative Y direction with respect to pullrods 18 associated with the cylinder shown rear and rightward. Pushrods 16 are similarly situated with respect to each other. It is cost effective that all four pullrods 18 are identical in design and the two pushrods 16 are the same. However, a disadvantage of such an offset design is that the engine is wider than it would otherwise be if the two cylinders could be collinear. A torque is introduced due to the offset of the two cylinders.

One alternative to overcome the offset cylinders is a forked rod, such as is described in U.S. Pat. No. 1,322,824, invented by F. Royce. By employing a forked rod/blade rod configuration within the engine of FIG. 1, the length of the journal (or crank pin) can be reduced. Also, the cylinders are collinear. The width of the engine can be reduced and the unbalanced forces are reduced. However, a disadvantage of such a configuration is that the piston in one cylinder couples with the crankshaft by a forked rod and the corresponding piston in the opposing cylinder couples with the crankshaft by a blade rod thereby increasing part count for the engine. A system for coupling the rods to the crankshaft is desired which allows common parts to be used in the two cylinder, such as is possible with the configuration shown in FIG. 1, while allowing collinear cylinders, such as that shown U.S. Pat. No. 1,322,824.

SUMMARY

Disclosed herein is a connecting-rod assembly that achieves a low part count while allowing for an in-line arrangement of cylinders. Such assembly includes: a cylindrical journal, first and second bearing shell portions placed on the journal, a first bearing cap placed on the first bearing shell portion and a second bearing cap placed on the second bearing shell portion. The first bearing cap has a concave surface that forms a cylindrical portion that mates with a convex surface of the first bearing shell portion. The first bearing cap has first and second fingers extending outwardly from a first end of the cylindrical portion with a gap of a predetermined width between the first and second fingers. The first bearing cap has a third finger extending outwardly from a second end of the cylindrical portion. The second bearing cap has a concave surface that forms a portion of a cylinder that mates with a convex surface of the second bearing shell portion. The second bearing cap has first and second fingers extending outwardly from a first end of the cylindrical portion with a gap of the predetermined width between the first and second fingers. The second bearing cap has a third finger extending outwardly from a second end of the cylindrical portion. The third finger of the first bearing cap engages with the first and second fingers of the second bearing cap and the third finger of the second bearing cap engages with the first and second fingers of the first bearing cap.

An orifice of a predetermined diameter is defined in each of the first, second, and third fingers of both the first and second bearing caps and the orifices are located near tips of the finger. The orifices are substantially parallel to the central axis of the journal.

The assembly further includes a first connecting rod with an outside edge of the connecting rod shaped roughly as an elongated isosceles triangle. The first connecting rod includes: a first corner adapted to couple with a reciprocating element, a second corner having a single tab of the predetermined width through which an orifice of the predetermined diameter is defined, and a third corner having double tabs each defining an orifice of the predetermined diameter. The double tabs are separated by a gap of the predetermined width and the first connecting rod is placed over the second bearing shell portion with the single tab meshing with the first and second fingers of the first bearing cap and the third finger of the first bearing cap meshing with the double tabs of the first connecting rod. A first pin is inserted through the orifice in the single tab and the orifices in the first and second fingers of the first bearing cap. A second pin is inserted through the orifices in the double tabs and the orifice in the third finger of the first bearing cap.

The assembly further includes a second connecting rod with an outside edge of the connecting rod shaped roughly as an elongated isosceles triangle. The second connecting rod includes: a first corner adapted to couple with a reciprocating element, a second corner having a single tab of the predetermined width through which an orifice of the predetermined diameter is defined, and a third corner having double tabs each defining an orifice of the predetermined diameter. The double tabs are separated by a gap of the predetermined width. The second connecting rod is placed over the first bearing shell portion with the single tab of the second connecting rod meshing with the first and second fingers of the second bearing cap and the third finger of the second bearing cap meshing with the double tabs of the second connecting rod. A third pin is inserted through the orifice in the single tab of the second connecting rod and the orifices in the first and second fingers of the second bearing cap. A fourth pin is inserted through the orifices in the double tabs of the second connecting rod and the orifice in the third finger of the second bearing cap.

The first pin has a radial groove proximate an end of the first pin and the second pin each has a radial groove proximate an end of the second pin with a first snap ring coupled to the groove in the first pin and a second snap ring coupled to the groove in the second pin.

Alternatively, a snap ring is inserted into an annular groove defined in the second finger; a snap ring is inserted into an annular groove defined in the third finger; a snap ring is inserted in an annular groove defined into a first of the double tabs; and a snap ring is inserted into an annular groove defined in a second of the double tabs.

In another alternative, a counterbore of a counterbore diameter is collinear with the orifice in the second finger. A snap ring is inserted into an annular groove defined in the second finger. A counterbore of the counterbore diameter is collinear with the orifice in one of the double tabs. A snap ring is inserted into an annular groove defined in the one of the double tabs. A body of the first and second pins is of the predetermined diameter and heads of the first and second pins are of the counterbore diameter.

According to some embodiments, first and second through-hole orifices are defined in the first bearing shell portion near an end of the first bearing shell portion and first and second threaded orifices are defined in the second bearing shell portion near an end of the second bearing shell portion. A first screw is inserted through the first through-hole orifice of the first bearing shell portion and threads of the first screw engaged with the first threaded orifice of the second bearing shell portion. A second screw is inserted through the second through-hole orifice of the first bearing shell portion and threads of the second screw engaged with the second threaded orifice of the second bearing shell portion.

According to some embodiments, the first bearing shell portion and the second bearing shell portion have fingers extending outwardly from at least one end of each the first and second bearing shell portions. An orifice is defined in the fingers with an axis of the orifice being substantially parallel to a central axis of the journal. The fingers of the first and second bearing shell portions are enmeshed to form a box joint with a dowel pin inserted through the orifices in the enmeshed fingers.

In some embodiments, the first bearing cap has a cylindrical concave surface and a pin extending radially from the cylindrical concave surface. The first bearing shell portion has a cylindrical convex surface having an aperture defined in the cylindrical convex surface and the pin engages with the aperture. The aperture is substantially evenly spaced between the ends of the first bearing shell portion and the aperture may be a groove extending less than 30 degrees of the circumference of the first bearing shell portion. The second bearing cap has a cylindrical concave surface and a pin extending radially from the cylindrical concave surface. The second bearing shell portion has a groove defined in a cylindrical convex surface associated with the second bearing shell portion. The groove associated with the second bearing shell portion extends less than the circumference of the second bearing shell portion and the pin associated with the second bearing cap engages with the groove associated with the second bearing shell portion. Relative rotational motion of the first bearing shell portion with respect to the first bearing shell cap is substantially prevented by the pin engaging with the aperture.

The first bearing shell portion has first and second oil holes located roughly 60 degrees from first and second ends of the first bearing shell portion, respectively; an inner surface of the first bearing shell portion has a first annular oil groove extending from the first end of the first bearing shell portion to the first oil hole; and the inner surface of the first bearing shell portion has a second annular oil groove extending from the second end of the first bearing shell portion to the second oil hole. A third oil groove defined in an outer surface of the first bearing shell portion extends between the first and second oil holes. Alternatively, a third oil groove is defined in a portion of the concave surface of the first bearing cap and the portion extends from first oil hole to the second oil hole of the first bearing shell portion at all relative positions of the first bearing cap with respect to the first bearing shell portion.

The first bearing cap has an oil hole through the cylindrical portion with the oil hole of a larger diameter at an end of the hole proximate the concave surface. The pin is hollow and the hollow pin is inserted in the oil hole.

According to an alternative embodiment, a threaded hole is defined in each end of the first, second, and third fingers with the threaded holes being substantially parallel. A first connecting rod having a rod portion, a journal connection portion, and a piston connection portion is provided with the journal connection portion having two parallel flanges that are substantially perpendicular with respect to an axis of the rod portion. A first of the flanges has two through holes and a second of the flanges has a single through hole. The journal connection portion further includes a surface facing away from the rod portion that defines a portion of a concave cylinder. A first bolt is placed within one of the two through holes and coupled with threads in the threaded hole defined in the first finger of the first bearing cap. A second bolt is placed within the other of the two through holes and coupled with threads in the threaded hole defined in the second finger of the first bearing cap. A third bolt is placed within the single through hole and coupled with the threads in the threaded hole defined in the third finger of the first bearing cap. A second connecting rod is similarly fixed to the second bearing cap.

The first bearing cap has two parallel bearing surfaces facing inwardly with the two parallel bearing surfaces extending away from the ends of the cylindrical portion of the first bearing cap.

The first connecting rod has two parallel bearing surfaces facing outwardly with the bearing surfaces of the first bearing cap bearing against the bearing surfaces of the first connecting rod.

The second bearing cap has two parallel bearing surfaces facing inwardly with the two parallel bearing surfaces extending away from the ends of the cylindrical portion of the second bearing cap; and the second connecting rod has two parallel bearing surfaces facing outwardly with the bearing surfaces of the second bearing cap bearing against the bearing surfaces of the second connecting rod.

In some embodiments, the journal is a portion of a crankshaft of an internal combustion engine with the journal predominantly rotating in one direction. In alternative embodiments, the journal oscillates back and forth without always rotating.

The third finger of the bearing caps has a width as measured along an axis parallel to a central axis of the journal substantially equal to the predetermined width of the gap between the first and second fingers of the bearing cap. In some embodiments, the first, second, and third fingers are substantially parallel.

Also disclosed is a journal-connecting rod assembly having a first connecting rod having a first corner adapted to couple with a reciprocating element, a second corner having a single tab of the predetermined width, and a third corner having double tabs. A first bearing cap has a concave surface that forms a cylindrical portion that mates with a convex surface of the first bearing shell portion, the first bearing cap has first and second fingers extending outwardly from a first end of the cylindrical portion, the first bearing cap has a third finger extending outwardly from a second end of the cylindrical portion, the third finger of the first bearing cap is slid between the double tabs at the third corner of the first connecting rod, and the single tab at the second corner of the first connecting rod is slid between the first and second fingers of the first bearing cap. A second connecting rod has a first corner adapted to couple with a reciprocating element, a second corner having a single tab, and a third corner having double tabs. The assembly further includes a second bearing cap having a concave surface that forms a cylindrical portion that mates with a convex surface of the first bearing shell portion. The second bearing cap has first and second fingers extending outwardly from a first end of the cylindrical portion and a third finger extending outwardly from a second end of the cylindrical portion. The third finger of the second bearing cap is slid between the double tabs at the third corner of the second connecting rod. The single tab at the second corner of the second connecting rod is slid between the first and second fingers of the second bearing cap. The assembly may further include a journal and first and second roller bearing portions each including multiple needle bearings nested within a bearing race. The first and second roller bearing portions coupled to the journal wherein an inner, concave portion of the cylindrical portion of the first and second bearing caps ride upon the needle bearings. Alternatively, the assembly includes a journal. An inner, concave portion of the cylindrical portion of the first and second bearing caps mate with an outer convex surface of the journal.

Also disclosed is a method to assemble two connecting rods to a single journal including: placing first and second portions of a bearing shell onto the journal; placing a first bearing cap over one of the two bearing portions wherein the first bearing cap has first and second fingers extending away from a top of the first bearing cap and a third finger extending away from a bottom of the first bearing cap; and meshing a second bearing cap with the first bearing cap. The second bearing cap has first and second fingers extending away from the bottom of the second bearing cap and a third finger extending away from a top of the second bearing cap. The meshing entails the third finger of the first bearing cap sliding into a gap between the first and second fingers of the second bearing cap and the third finger of the second bearing cap sliding into a gap between the first and second fingers of the first bearing cap.

The method may also include: placing a first connecting rod onto an outside surface of the second bearing cap, inserting a first bolt into a first through hole in the first connecting rod, engaging threads in a first bolt hole in the first finger of the first bearing cap with threads of the first bolt, inserting a second bolt into a second through hole in the first connecting rod, engaging threads in a second bolt hole in the second finger of the first bearing cap with threads of the second bolt, inserting a third bolt into a third through hole in the first connecting rod, engaging threads in a third bolt hole in the third finger of the first bearing cap with threads of the third bolt, placing a second connecting rod onto an outside surface the first bearing cap, inserting a fourth bolt into a first through hole in the second connecting rod, engaging threads in a first bolt hole in the first finger of the second bearing cap with threads of the fourth bolt, inserting a fifth bolt into a second through hole in the second connecting rod, engaging threads in a second bolt hole in the second finger of the second bearing cap with threads of the fifth bolt, inserting a sixth bolt into a third through hole in the second connecting rod, and engaging threads in a third bolt hole in the third finger of the second bearing cap with threads of the sixth bolt. In some embodiments, the first bearing cap has a pin extending outwardly and an outer surface of the first portion of the bearing shell defines an aperture. The method may include engaging the pin with the aperture to limit the movement of the first bearing cap with respect to the first portion of the bearing shell.

In some alternative embodiments, the method includes placing a first connecting rod onto an outside surface of the second bearing cap. A first end of the first connecting rod is adapted to couple with a reciprocating element; a first corner on a second end of the first connecting rod has a single tab having an orifice; a second corner on a second end of the first connecting rod has two tabs each having an orifice with the single tab meshing with the second and third fingers of the second bearing cap and the first finger of the second bearing cap meshing with the two tabs. The method may further include inserting a first pin through the orifice in the single tab and the orifices in the second and third fingers of the second bearing cap, inserting a second pin through the orifices in the two tabs and the orifice in the first finger of the second bearing cap, installing a first snap ring proximate the first pin, and installing a second snap ring proximate the second pin. The second connecting rod may be similarly assembled onto the journal.

Also disclosed is a journal and connecting rod assembly, including a cylindrical journal, first and second bearing portions coupled onto the journal, a first bearing cap placed on the first bearing portion, the first bearing cap having a concave surface that mates with a convex surface of the first bearing portion, and a second bearing cap placed on the second bearing portion. The second bearing cap has a concave surface mating with a convex surface of the second bearing portion. The first bearing cap has first and second fingers extending outwardly from a first end of a cylindrical portion of the first bearing cap and a third finger extending outwardly from a second end of the cylindrical portion of the first bearing cap. The second bearing cap has first and second fingers extending outwardly from a first end of a cylindrical portion of the second bearing cap and a third finger extending outwardly from a second end of the cylindrical portion of the second bearing cap. The third finger of the first bearing cap engages with the first and second fingers of the second bearing cap and the third finger of the second bearing cap engages with the first and second fingers of the first bearing cap. Each of first, second, and third fingers of first and second bearing caps has an orifice defined therein. The assembly may further include a first connecting rod having three orifices adapted to align with the three holes in the first, second, and third fingers of the first bearing cap and a second connecting rod having three orifices adapted to align with the three holes in the first, second, and third fingers of the second bearing cap. Axes of the three orifices in the first and second connecting rods and axes of the holes in the first, second, and third fingers of the first and second bearing caps are substantially parallel to a central axis of the journal. The orifices are aligned with the associated holes. Pins are inserted into the aligned orifices and holes. Alternatively, axes of the three orifices in the first and second connecting rods axes of the holes in the first, second, and third fingers of the first and second bearing caps are substantially perpendicular to a central axis of the journal and roughly parallel with the first second and third fingers of the associated bearing cap. The orifices are aligned with the associated hole and the holes in the bearing cap are threaded and bolts are inserted into the orifices and engaged with the threads in the holes.

The assembly may further include a longitudinal oil hole defined in the journal roughly parallel with an axis of rotation of the journal, a radial oil hole defined in the journal fluidly coupling the longitudinal oil hole and a surface of the journal, oil holes defined in the first and second bearing shell portions with the oil holes located approximately one-third of the distance between ends of the bearing shell portions, an oil groove on a concave surface of the first bearing shell portion extending circumferentially between an oil hole and a proximate end of the first bearing shell portion, an oil groove on a concave surface of the second bearing shell portion extending circumferentially between an oil hole and a proximate end of the second bearing shell portion, an oil groove on a convex surface of the first bearing shell portion between oil holes, and an oil groove on a convex surface of the second bearing shell portion between oil holes.

The assembly may have a pin inserted into an orifice in the concave surface of the first bearing cap with the pin extending inwardly and an aperture defined in the first bearing portion with the pin indexed with the aperture to restrict relative movement between the first bearing portion and the first bearing cap with the pin indexed with the aperture substantially prevents relative movement and the second bearing cap is unpinned.

In some embodiments, the aperture is a first groove and the assembly further has a pin inserted into an orifice in the concave surface of the second bearing cap and a second groove defined in the second bearing portion with the pin indexed with the aperture. The first and second grooves extend a predetermined length on a convex surface of the first and second bearing portions so as to restrict relative movement of the first bearing portion with respect to the first bearing cap and relative movement of the second bearing portion with respect to the second bearing cap.

An advantage provided by embodiments described above, is that a single, common bearing is provided for two pullrods, i.e., to accommodate two pistons thereby allowing a more compact engine. Furthermore, the friction is reduced. The friction is the same during pulling, but for the portion of the rotation with no pulling, there is no friction, thereby reducing the overall friction of the engine.

BRIEF DESCRIPTION OF THE DRAWINGS

FIG. 2 is an isometric view of a connecting rod to crankshaft journal connection according to an embodiment of the present disclosure;

FIGS. 3 and 4 show a connecting rod and a bearing cap related to the components illustrated in FIG. 2;

FIGS. 12, 14, and 17 illustrate the arrangement of the pistons and connecting rods in different angles of crank rotation;

FIGS. 13 and 15 show a detail of the crank connection at two crank positions according to one embodiment for pinning a shell bearing portion;

FIGS. 19 and 20 are flowcharts of the assembly processes for two embodiments of the disclosure.

DETAILED DESCRIPTION

Figure 1:
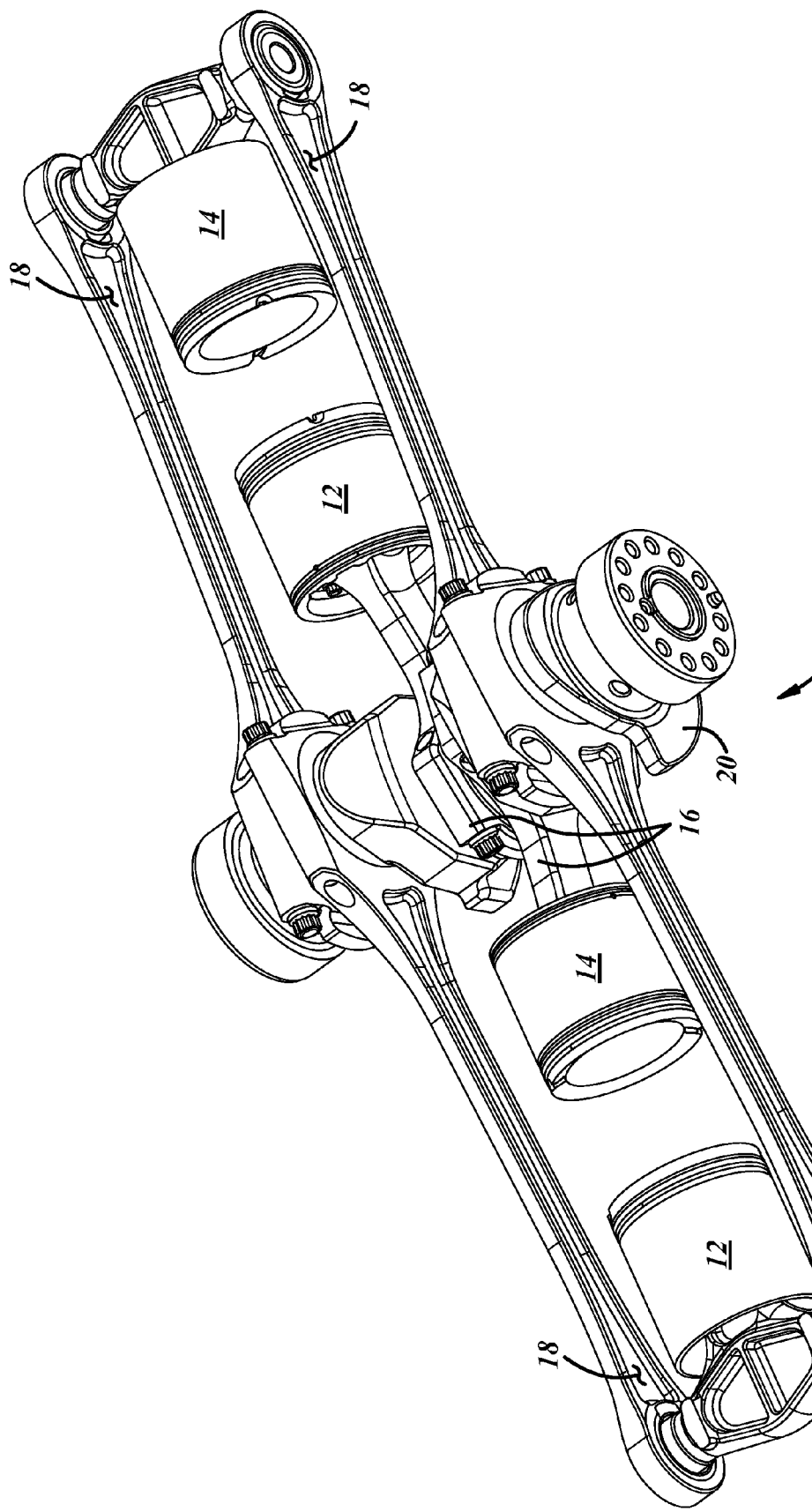
FIG. 1 illustrates an example configuration of an opposed-piston, opposed-cylinder engine in an isometric view.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

In FIG. 2 an isometric view of a journal 96 with a central axis 99 that coincides with a center 97 of journal 96 is shown. Journal 96 is coupled to two connecting rod portions 100a and 100b via respective bearing caps 102a and 102b. Two bearing shell portions 98a, 98b are included between bearing caps 102a, 102b and journal 96. Each of bearing caps 102a and 102b has a first finger 104a (104a not visible in FIG. 2) and 104b, a second finger 106a and 106b, and a third finger 108a), and 108b. First finger 104a and second finger 106a of bearing cap 102a mesh with third finger 108b of bearing cap 102b. A gap between first finger 104a and second finger 106a is substantially equal to the width of third finger 108b. Furthermore, the width of first finger 104a is approximately equal to the width of second finger 106a. Connecting rod 100a has a first flange 110a and a second flange 112a; connecting rod 100b has first and second flanges 110b, 112b. Through holes 116b and 118b are provided in flange 112b; through hole 122b is provided in flange 110b. Bolts 124b, 126b are slid into through holes 116b and 118b, respectively, and engaged with threaded holes 128b, 130b in fingers 104b and 106b, respectively. A bolt 132b is slid into through hole 122b and engaged with a threaded hole 134b.

In FIG. 4, a single pullrod 100 is shown having a first flange 110 with a hole 122 and a second flange 112 with two orifices 116 and 118 (as the two orifices are in line, only one is shown in phantom). A concave surface 136 forms a portion of a cylinder. Pullrod 100 also has a rod portion with a small end portion 142 at one end. Pullrod 100 also has bearing surfaces 144. Bearing surfaces 144 lie in planes parallel to each other and are located at ends of concave surface 136. Bearing surfaces 144 face outwardly. Pullrod 100 can be described as having a piston connection portion (alternatively referred to as small end portion 142), journal connection portion 143, and rod portion 145 between the two connection portions. FIG. 4 illustrates a bearing cap 102 that can be coupled to pullrod 100. Of first and second fingers 104 and 106, only one is visible in this view. On the other end of bearing cap 102 is third finger 108. Threaded hole 134 aligns with through hole 110 of pullrod 100. Threaded holes 128 and 130 align with through holes 116 and 118 of pullrod 100. Bearing cap 102 has a concave surface 146 that forms a portion of a cylinder. Extending from the ends of concave surface 146 are bearing surfaces 148 which are parallel and face each other. When bearing cap 102 is assembled with pullrod 100, bearing surfaces 144 of pullrod 100 bear against bearing surfaces 148 of bearing cap 102. Bearing surfaces 144 support bearing cap 102 from crushing as it is pulled at fingers 104, 106, and 108. If bearing cap 102 is even slightly deformed, it becomes out of round and increases friction in the journal.

Figure 5:
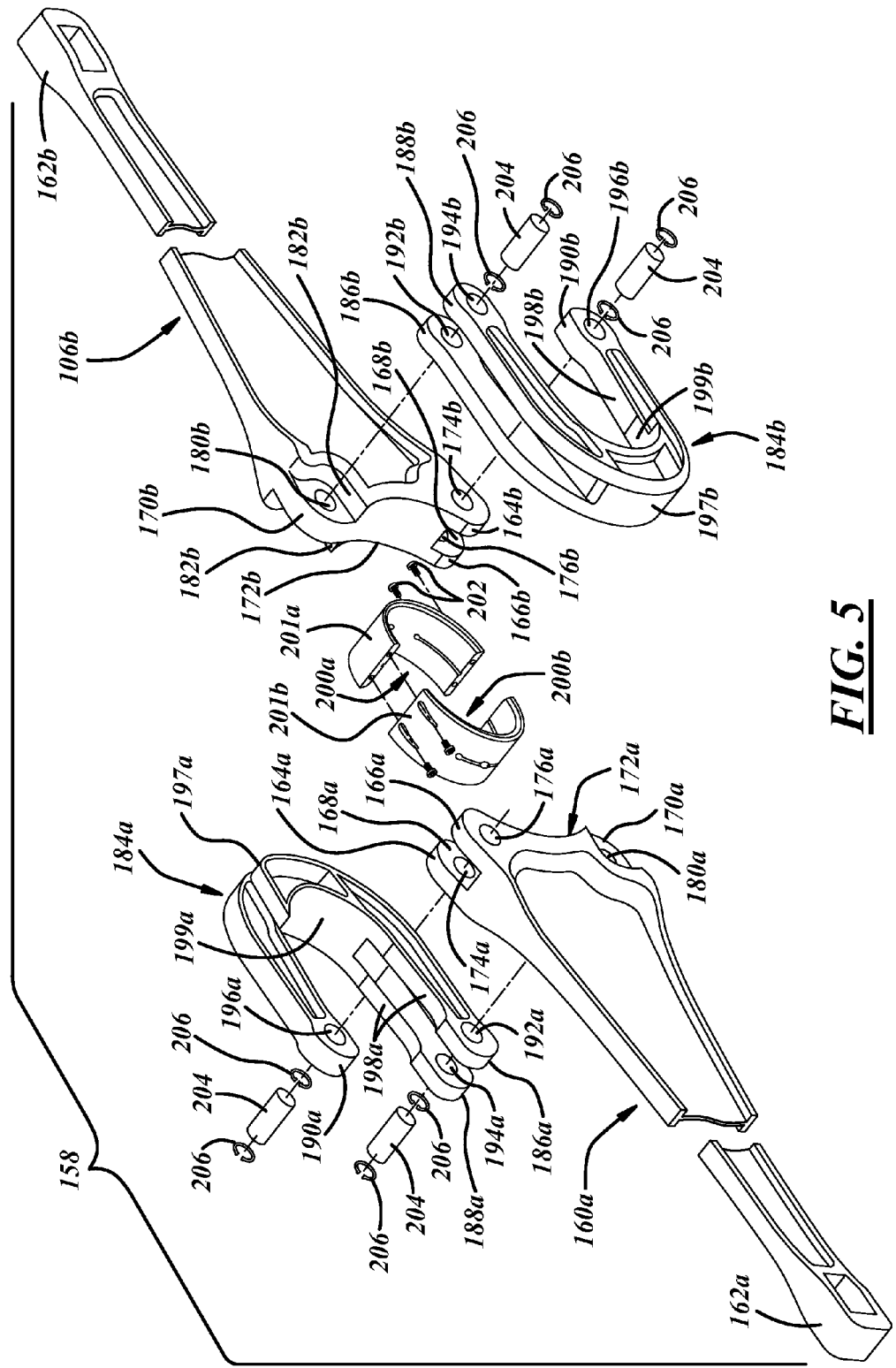
FIG. 5 is an exploded view of a connecting rod/bearing cap system according to an embodiment of the present disclosure.

An alternative embodiment of a pullrod/bearing cap system 158 is shown in FIG. 5 in an isometric, exploded view. Pullrods 160a and 160b have small ends 162a and 162b adapted to couple with reciprocating elements, such as pistons. Pullrod 160a has a first tab 164a and a second tab 166a separated by a gap 168a of a predetermined width. Pullrod 160a has a third tab 170a. Each of first, second, and third tabs 164a, 166a, and 170a has orifices: 174a, 176a, and 180a, respectively, each of a predetermined diameter. Pullrods 160a and 160b have concave surfaces 172a and 172b that form a portion of a cylinder. Pullrod 160a and 160b have bearing surfaces that are in contact with bearing surfaces of the bearing caps. Most of these bearing surfaces are not visible in FIG. 5, except for bearing surface 182b of pullrod 160b. A corner of bearing surface 180b is visible on the far side of third tab 170b; another bearing surface (not visible) is provided between first and second tabs 164b and 166b. Pullrod 160a has similar bearing surfaces as pullrod 160b, but none of such bearing surfaces on pullrod 160a are visible in this view. These bearing surfaces are provided to prevent crushing of the bearing cap, as will be described in more detail below.

Also shown in FIG. 5 is a bearing cap 184a that has first and second fingers 186a and 188a separated by a gap of the predetermined width (substantially the same width as the gap between the first and second tabs, i.e., gap between 164a and 166a; and gap between 164b and 166b). Bearing cap 184a also has a third finger 190a having a width of the predetermined width. Fingers 186a, 188a, 190a, 186a, 188a, and 190a each have an orifice, 192a, 194a, 196a, 192a, 194a, and 196a, respectively located substantially parallel to a central axis of the journal (not shown in FIG. 5). First and second fingers 186a and 188a are substantially the same width; third finger 190a is approximately twice the width of first finger 186a. The gap between first and second fingers 186a and 188a is substantially the same as the width of third finger 190a. Bearing cap 184a has three bearing surfaces: two bearing surfaces 198a on first and second fingers 186a and 188a and one bearing surface (not visible) on third finger 190a. The bearing surface on third finger 190a is substantially parallel with and faces toward bearing surfaces 198a on first and second fingers 186a and 188a. Bearing cap 184b is identical to bearing cap 184; however, as oriented in FIG. 5, only one of three bearing surfaces 198b is visible, i.e., bearing surface 198b associated with third finger 190b.

Bearing surfaces 198a and 198b of bearing caps 184a and 184b bear against bearing surfaces 182a and 182b of pullrods 160a and 160b, respectively. Bearing caps 184a and 184b have concave surfaces 199a and 199b that are portions of a cylinder. Also shown in FIG. 5 are bearing shell portions 200a and 200b. Concave surfaces 172a and 172b of pullrods 160a and 160b mate with convex surfaces 197a (197a not visible in FIG. 5) and 197b of bearing caps 184a and 184b, respectively. Concave surfaces 199a and 199b of and bearing caps 184a and 184b mate upon convex surfaces 201a and 201b of bearing shell portions 200a and 200b, respectively.

To assemble the connecting rod assembly, bearing shell portions 200a and 200b are placed over a cylindrical journal (not shown in FIG. 5). Bearing shell portions 200a and 200b are coupled via four screws 202, shown in FIG. 5. Bearing caps 184a and 184b are placed over bearing shell portions 200a and 200b with fingers of the bearing caps meshing: first and second fingers of one bearing cap meshing with the third finger of the other bearing cap and vice versa. One of the pullrods is placed over one of the bearing caps such that orifices in the tips of the pullrods align with orifices in fingers of the bearing cap. A pin 204 is placed through the aligned orifices, one at the top and one at the bottom, and secured with snap rings 206, one at each end of pins 204, as per the embodiment in FIG. 5. The other pullrod is similarly secured to the other bearing cap.

One advantage of embodiments of the present disclosure is that pullrod 160a is identical to pullrod 160b just as bearing cap 184a is identical with bearing cap 184b. In FIG. 5, pullrod 160a is "upside down" with respect to pullrod 160b such that the corner of pullrod 160b has the corner with single tab 170b pointing upwardly and pullrod 160a has the corner with single tab 170a pointing downwardly in FIG. 5. In the embodiment in FIG. 3, pullrods 100a and 100b are identical; and bearing caps 102a and 102b are identical. By having identical parts, the number of unique parts to assemble an engine is reduced thereby reducing cost of the product.

Another advantage of the assembly shown in FIG. 5 is that pins 204 are in shear. These can be made rather smaller in diameter than other connection schemes. Smaller pins facilitate smaller orifices in the pullrod and the bearing cap thereby allowing smaller tabs and smaller fingers, respectively. The mass of the parts can be reduced and the assembly is more compact. Reducing mass of the rotating components present many advantages: less unbalanced force, reduced cost due to reduced material, reduced size of related parts, e.g., mounts, bearings. Yet a further advantage is reduced machining and assembly steps, thereby further reducing cost of manufacture.

Figure 6:
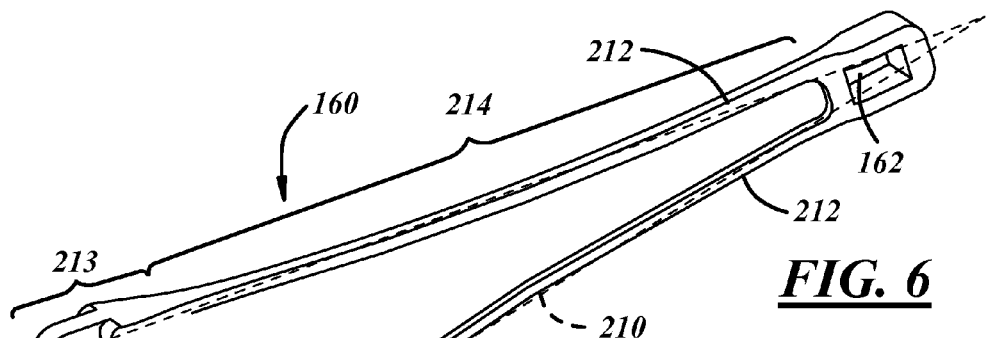
FIG. 6 is an illustration of the connecting rod of FIG. 5.
Figure 7:
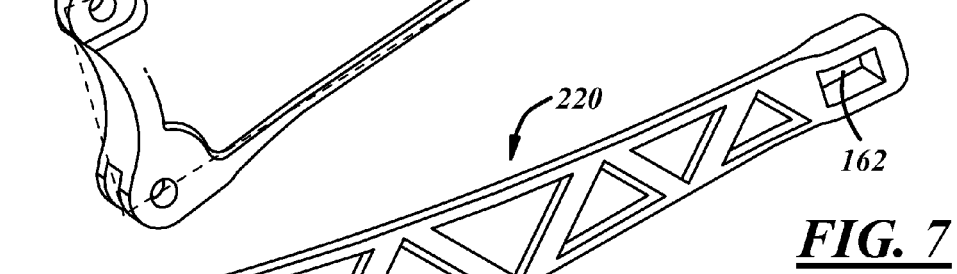
FIG. 7 is an alternative connecting rod.
Figure 9:
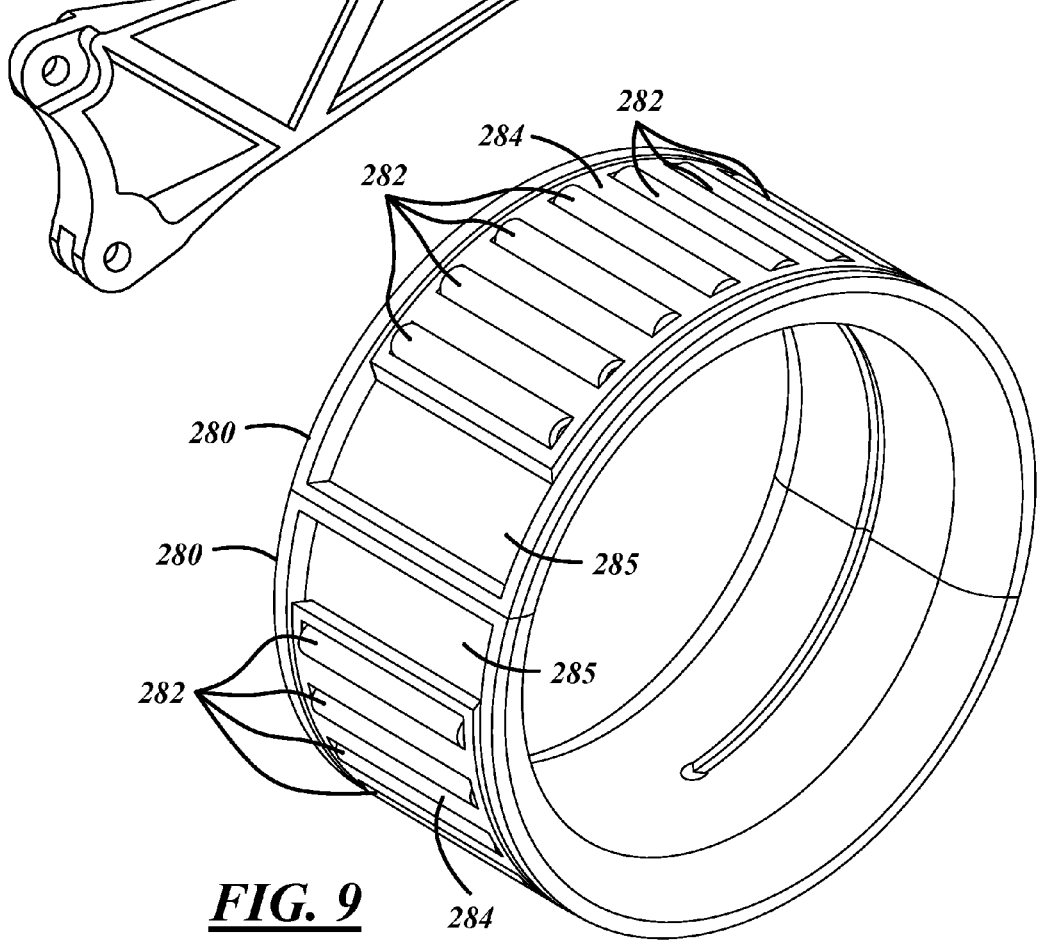
FIG. 9 illustrates an alternative roller bearing embodiment.

In FIG. 6, it can be seen that pullrod 160 is shaped roughly in the shape of an isosceles triangle 210 with small end portion 162 at one corner of the triangle. Other edges 212 on the long sides of the roughly triangular shape are thicker than the center portion of pullrod 160. Pullrod 160 can be considered to include a piston connection portion (which is alternatively the small end portion 162), a journal connection portion 213, and a rod portion 214 between the two connection portions. In another embodiment shown in FIG. 7, pullrod 220 forms a lattice in the central region.

Figure 8A:
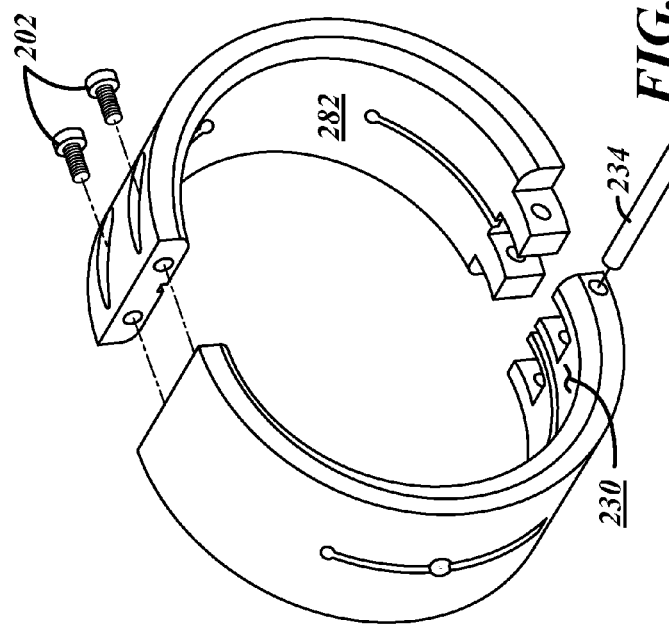
FIG. 8A illustrates the bearing shell portions of FIG. 5.

An isometric drawing of the bearing shell portions in an exploded view is shown in FIG. 8A. Bearing shell portions 200a and 200b are fastened by screws 202 that pass into through holes 222a which are large enough to accommodate the head of screws 202 and into through holes 223a and then into threaded holes (not visible in this view) associated with bearing shell portion 200b, similar to threaded holes 224a. Lubrication grooves 225 are provided in the concave surfaces 211a and 221b in the bearing shell caps 200a and 200b. Oil supply to lubrication grooves 225 is shown in more detail in FIGS. 13, 15, 16, and 18. Oil supplied to oil grooves 225 passes through oil holes 227 to oil grooves 226 formed in the convex surfaces 201a and 201b (oil groove 226 in bearing cap 200a is not visible in FIG. 8A).

Figure 8B:
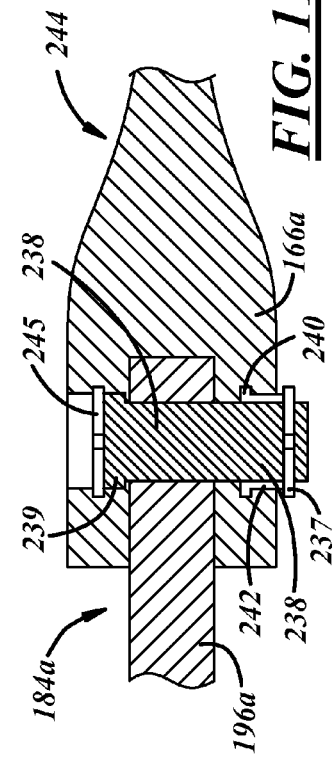
FIG. 8B illustrates an alternative embodiment to secure the bearing shell portions.

In an alternative embodiment illustrated in FIG. 8B, bearing shell portions 230 and 232 have interlocking fingers at one end with holes through the fingers so that a pin 234 may be inserted through the holes. In one embodiment, shell bearing portions 230 and 232 are installed on a journal of a crankshaft with the crankshaft having weights on either side of the journal so that pin 234 cannot fall out. In other embodiments without features holding the pin in place, the pin has a head on one end and a snap ring on the other end. Alternatively, the pin is secured by snap rings in an internal fashion. Any suitable way of securing the pin can be used.

In yet another embodiment, the shell bearing portions are eliminated altogether. In some alternatives, either the journal or the bearing cap inner cylindrical surface is provided with a surface coating that is suitable to serve as a bearing material. Optionally, oil grooves are included to allow passage of the oil to bearing surfaces.

FIGS. 8A and 8B illustrate bearing shell portions that are fixed together. This ensures that the lubrication passes through the lubrication grooves, as described below. If the pullrod is always under tension, then there is no need to secure the bearing shell portions to each other as the forces in the system cause the bearing shell portions to remain pressed against the journal. Thus, in one embodiment, there are no screws or pins holding the two together. In assembly, the bearing shell portions can be held onto the journal by a thicker oil or grease until secured in place when the bearing caps and connecting rods are installed. Even in a system with momentary instances of a loss of the pressure, it may be possible to withstand such short durations with a momentary loss of oil flow thereby also allowing the bearing shell portions to be installed without screws or pins.

In an alternative embodiment roller bearing portions 280 are used instead of bearing shell portions. Roller bearing portions 280 include a cage 284 into which needle bearings 282 are retained.

Figure 10:
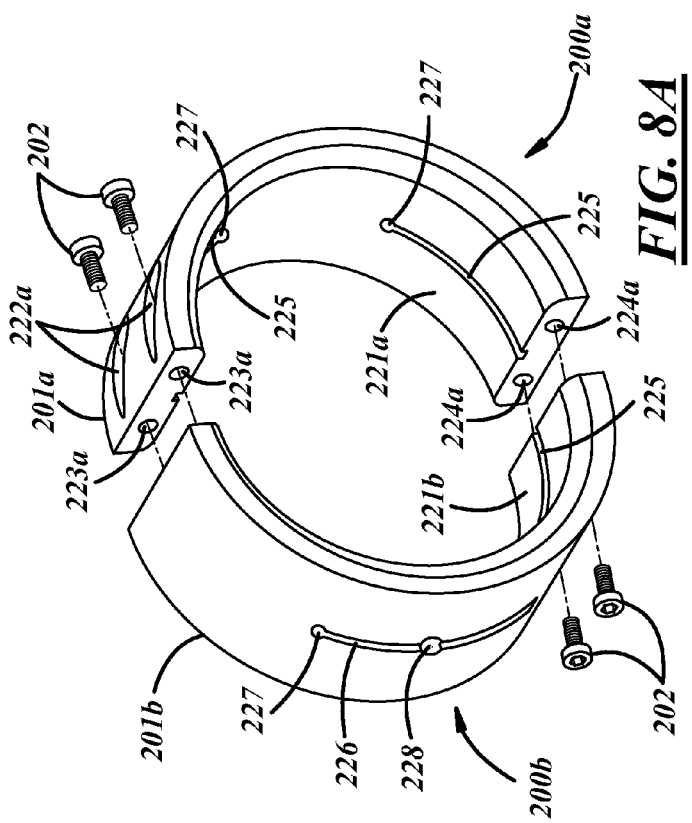
FIGS. 10 and 11 illustrated various embodiments for pinning the pullrod with the bearing cap.

In FIG. 10, a cross section of one of the pinned joints between connecting rod 160a and bearing cap 184a is shown. Pin 204 is inserted through aligned orifices in finger 196a, and tabs 164a and 166a. One of snap rings 206 can be installed before or after insertion of pin 204. At least one of snap rings 206 is installed in one of the annular grooves formed the orifices in one of tabs 164a and 166a. A similar configuration may be used to couple the connecting rod 160a and bearing cap 184a involving fingers 186a and 188a with tab 180a.

Figure 11:
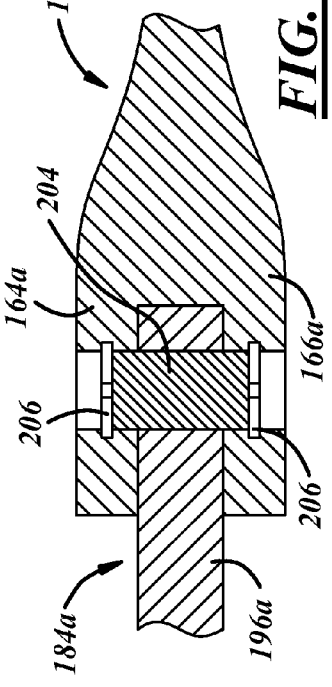

FIG. 11 illustrates a couple of alternative embodiments. At the bottom of the joint as shown in FIG. 11, a pin 238 sits proud of the aligned orifices in bearing cap 184a and connecting rod 244. A snap ring 237 engages with a groove on pin 238. In configurations with sufficient space, such a configuration may be desirable to avoid providing a groove within the orifice through which the pin sits, such as is shown in FIG. 10 to accommodate the snap rings within the orifice. In FIG. 11, a counter bore 242 and a groove 240 are shown, but not needed for the pin 238 to snap ring 237 connection as shown. Such counter bore 242 and groove 240 are shown to illustrate the modifications to the orifice that accommodate the upper connection scheme. In the upper example, pin 238 has a head 239 with a larger diameter than the pin body and sits on the shoulder formed by the counter bore 242. A snap ring 245 is inserted proximate head 239 of pin 238 into the groove (not seen individually in FIG. 11, but is the same as groove 240 shown in the bottom joint.) The upper joint is sufficient to secure pin 238 as head 239 prevents the pin from moving downward and snap ring 245 prevents the pin from moving upward. The lower joint is shown simply for illustration convenience, i.e., to allow discussion of two embodiments relative to one figure.

A number of pin embodiments are contemplated with a number of tradeoffs. It is desirable have an orifice as small as possible so that the size of the fingers of bearing cap 184a and the tabs on connecting rod 244 can be smaller. The pin connection at the bottom of FIG. 11 allows this, but at a cost of additional length with the pin extending outwardly from the joint. Another desirable feature is for the parts to be symmetrical with the same machining operation on both ends to avoid potential assembly issues due to orientation.

A portion of the engine is shown in FIG. 12 at a condition where pistons 12 and 14 in the left hand cylinder (cylinder not shown) are at their position of closest approach and pistons 12 and 14 in the right hand cylinder (cylinder not shown) are their farthest position. A detail of this position is shown in FIG. 13. At the center is a cross section of a journal 250 that is part of a crankshaft is shown. Oil is provided along the crankshaft through a channel 252, which is shown in cross section. An oil passage 254 fluidly couples channel 252 through the crankshaft with an outer surface of journal 250 with an opening 255. As journal 250 rotates, opening 255 provides oil to the inside surfaces of shell bearing portions 200a and 200b. Oil passes out through oil holes 227 along grooves 226 through oil holes 260 in bearing caps 184a and 184b to provide lubricating between bearing cap 184a and pullrod 160b and between bearing cap 184b and pullrod 160a which rotate relative to each other a modest amount during the revolution of the crankshaft. It is desirable to maintain oil holes 227 about 30 degrees displaced (one 30 degrees upward and one 30 degrees downward) from a point of maximum force on the bearing cap. To facilitate that and to maintain the oil passages in desirable locations, it is desirable to restrict the motion of the shell bearing portions 200a and 200b with their respective bearing caps 184a and 184b. In the embodiment shown in FIG. 13, a pilot hole 256 is provided in the back of shell bearing portions 200a and 200b. A hollow pin 258 is inserted through oil passage 260 to index with pilot hole 256. Pilot hole 256 in bearing cap 184b is not used. However, for the purpose of keeping bearing shells 200a and 200b identical to reduce the number of unique parts in the engine, both bearing shells are provided with pilot holes 256. Pin 258 is hollow to allow oil to be conducted through pin 258 and passage 260 to the interface between bearing cap 184a and pullrod 160b.

In FIG. 14, the engine is shown at a different point in the rotation with pistons 12 and 14 of the left hand cylinder at a position of about 60 degrees before top dead center (TDC) and pistons 12 and 14 of the right hand cylinder at a position of about 120 degrees after TDC. As journal 250 is at, or near, its most upward position (upward as shown in FIG. 14), pushrod 264 that couples crankshaft 20 to piston 14 of the left cylinder is visible.

In the detail of the crank connection shown in FIG. 15, oil passage 254 is displaced and opening 255 is providing oil to a different location on shell bearing portion 200a than that shown in FIG. 13. In FIG. 14, shell bearing portion 200a is displaced counterclockwise, slightly, compared to the position shown in FIG. 13. As explained above, shell bearing portion 200a is pinned to bearing cap 184a. The slight counterclockwise rotation of bearing cap 184a and shell bearing portion 200a is due to pullrod 160a being cocked upward at the end associated with journal 250 due to journal 250 being at its most upward position, as can be seen in FIG. 14. As shell bearing portion 200a is pinned to bearing cap 184a via pin 258, they rotate together. Shell bearing portion 200b, on the other hand, is free floating as can be seen with oil passage 260 rotated clockwise with respect to pilot hole 256 in shell bearing portion 200b. The range of motion of shell bearing portion 200b is limited, however, by shell bearing portion 200a. In fact, shell bearing portion 200a moves shell bearing portion 200b.

Figure 16:
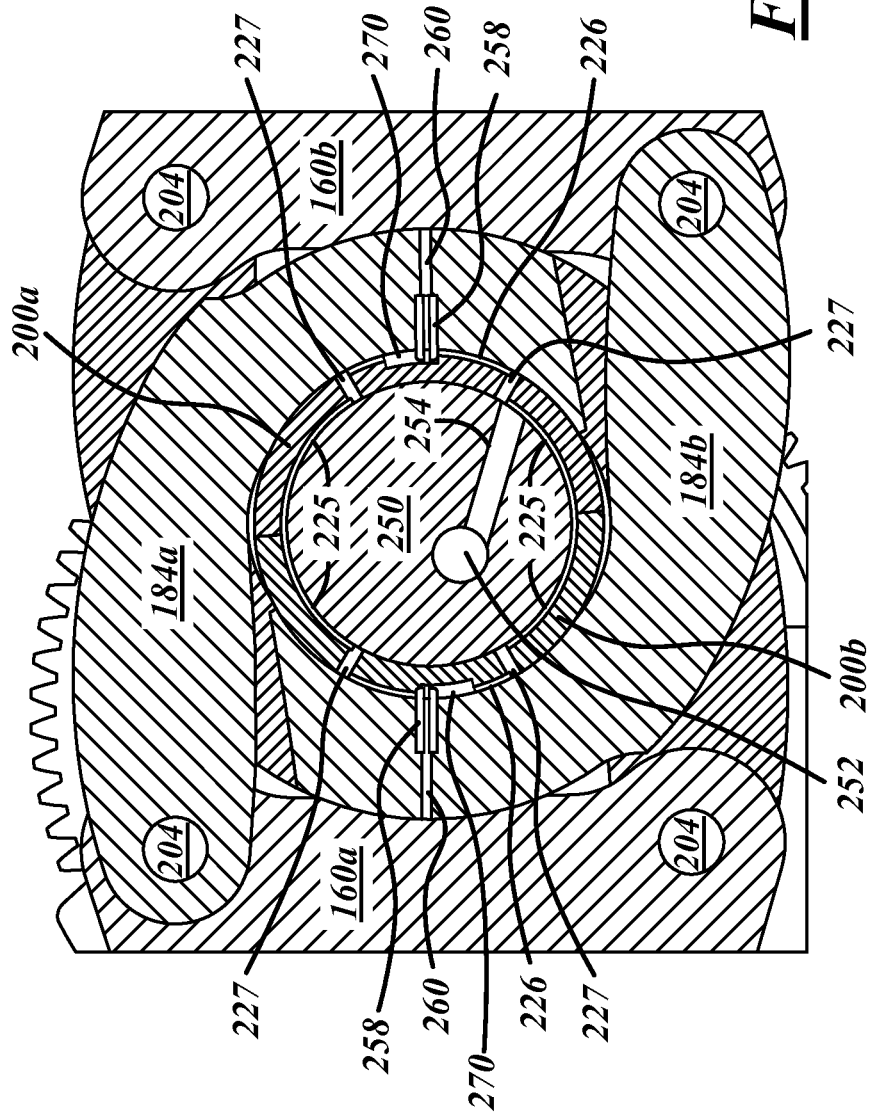
FIGS. 16 and 18 show a detail of the crank connection at two crank positions according to one embodiment for restricting motion of the shell bearing portions.
Figure 17:
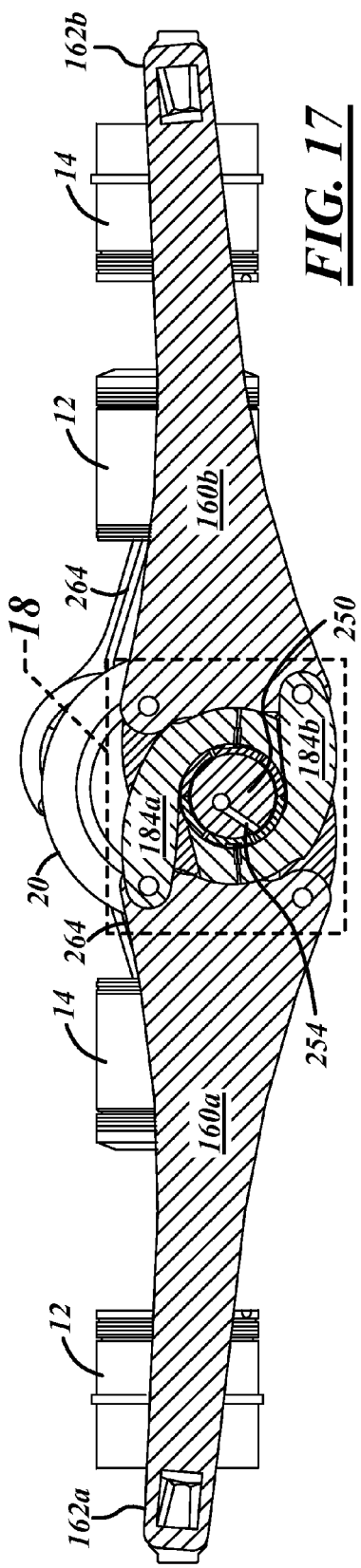
Figure 18:
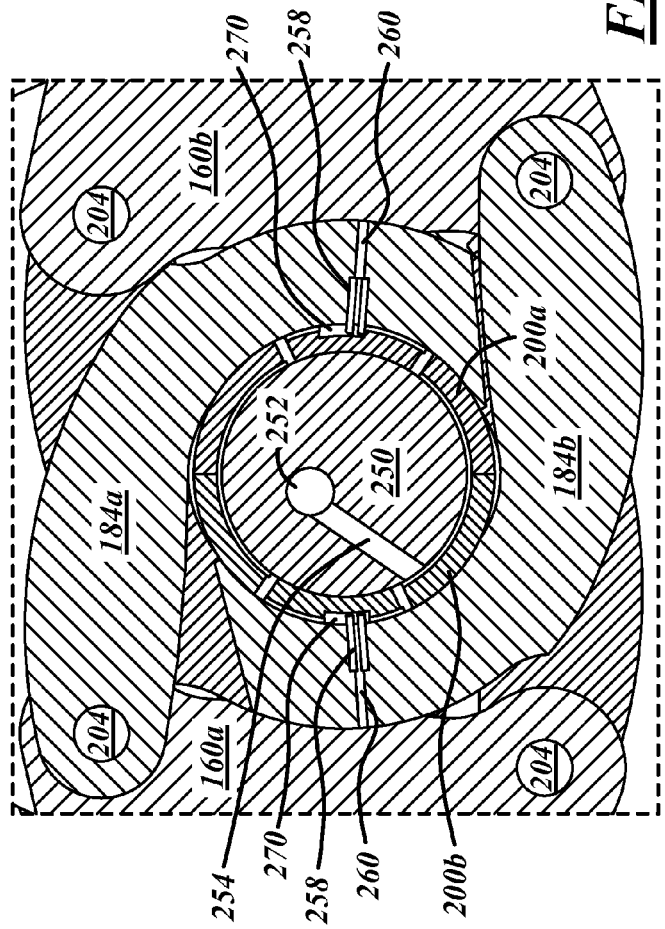

An alternative arrangement to restrict the movement of the shell bearing portions is illustrated in FIGS. 16-18. In FIG. 16, a detail of the crank connection is shown. The position of the pistons that relates to the position shown in FIG. 16 is identical to that shown in FIG. 12, i.e., pistons in the left cylinder are at, or near, TDC; and pistons in the right cylinder are at, or near, BDC. Shell bearing portions 200a and 200b each have a slot 270 defined in the outside convex surface. Hollow pins 258 are inserted in oil passages 260 and extend inwardly toward shell bearing portions 200a and 200b so that they engage with slots 270. The angle of the circumference of shell bearing portions 200a and 200b over which slots 270 extend is related to the relative movement of pullrods 160a and 160b as they rotate. (Axes of pullrods 160a and 160b are roughly collinear in FIG. 12; the axes of pullrods 160a and 160b have a relative angle of about 170 degrees in FIG. 14.) In FIG. 16, shell bearing portions 200a and 200b are displaced counterclockwise compared to their position as shown in FIG. 13. Their position, in FIG. 16, is displaced toward one end of travel with respect to slots 270. The pulling force acting through one of the pullrods 160a or 160b is greater than the force on the other pullrod thereby clamping the associated bearing cap against the associated shell bearing portion. The other shell bearing portion without so much clamping force rotates. Of course, movement of the clamped shell bearing portion is restricted by slot 270. Nevertheless, it is the uneven forces on the shell bearing portions that causes them to end up in a displaced position as in FIG. 15 rather than a neutral position with the interfaces between the shell bearing portions being vertical as shown in FIG. 13.

In FIG. 17, the engine is shown at a position in which the pistons in the left cylinder are at 90 degrees after TDC and the pistons in the right cylinder are at 90 degrees before TDC. A small portion of each of the pushrods 264 is visible in this position.

In FIG. 18, a detail of the crank connection related to FIG. 17 is shown. Pin 258 that engages with shell bearing portion 200a is at one end of slot 270. However, pin 258 that engages with shell bearing portion 200b is at an intermediate position between the ends of slot 270. Shell bearing portions 200a and 200b shuttle back and forth, although rotating in concert, depending on the positions of pullrods 160a and 160b and the forces acting between shell bearing portions and their associated bearing cap.

A flowchart indicating a method to assemble the configuration of FIG. 2 is shown in FIG. 19. In block 400, bearing shell portions are placed over the crankshaft journal and fastened together. In other embodiments not requiring it, the bearing shell portions are not fastened together, i.e., simply placed over the journal. In block 402, the bearing shell portions are placed over the bearing caps with the fingers of the bearing caps meshing. In block 404, flanges of one of the pullrods are aligned with one of the bearing caps with the through holes aligning with the bolt holes. In block 406, three bolts are inserted through the three through holes and then engaged with the three threaded holes. In block 408, the other pullrod is aligned with the other bearing cap. In block 410, the pullrod is bolted to the bearing cap with bolts inserted through the through holes and engaged with the threads in the threaded holes.

A flowchart indicating a method to assemble the configuration of FIG. 5 is shown in FIG. 20. In block 420, bearing shell portions are placed over the crankshaft journal and fastened together. In block 422, bearing caps are placed over the bearing shell portions with the fingers of the bearing caps meshing. The pin, or pins, of the bearing caps are engaged with the pilot hole or grooves in the bearing shell portions, as appropriate. The orifices of one of the pullrods are aligned with the orifices of one of the bearing caps in block 424. In block 426, pins are installed through the aligned orifices. The pins are secured in the aligned orifices. In block 428, the orifices of the other pullrods are aligned with the orifices of the other bearing caps. In block 430, pins are installed through the aligned orifices and secured.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. A journal-connecting rod assembly, comprising:
a cylindrical journal;
first and second bearing shell portions placed on the journal;
a first bearing cap placed on the first bearing shell portion wherein the first bearing cap has a concave surface that forms a cylindrical portion that mates with a convex surface of the first bearing shell portion, the first bearing cap has first and second fingers extending outwardly from a first end of the cylindrical portion with a gap of a predetermined width between the first and second fingers, and the first bearing cap has a third finger extending outwardly from a second end of the cylindrical portion;
a second bearing cap placed on the second bearing shell portion, the second bearing cap having a concave surface that forms a portion of a cylinder that mates with a convex surface of the second bearing shell portion, the second bearing cap having first and second fingers extending outwardly from a first end of the cylindrical portion with a gap of the predetermined width between the first and second fingers, the second bearing cap having a third finger extending outwardly from a second end of the cylindrical portion wherein the third finger of the first bearing cap engages with the first and second fingers of the second bearing cap and the third finger of the second bearing cap engages with the first and second fingers of the first bearing cap; and
an orifice of a predetermined diameter defined in each of the first, second, and third fingers of both the first and second bearing caps, wherein the orifices are located near tips of the fingers and the orifices are substantially parallel to a central axis of the journal.

2. The assembly of claim 1, further comprising:
a first connecting rod with an outside edge of the connecting rod shaped roughly as an elongated isosceles triangle wherein the first connecting rod comprises:
a first corner adapted to couple with a reciprocating element;
a second corner having a single tab of the predetermined width through which an orifice of the predetermined diameter is defined; and
a third corner having double tabs each defining an orifice of the predetermined diameter,
wherein the double tabs are separated by a gap of the predetermined width and the first connecting rod is placed over the second bearing shell portion with the single tab meshing with the first and second fingers of the first bearing cap and the third finger of the first bearing cap meshing with the double tabs of the first connecting rod;
the assembly further comprising:
a first pin inserted through the orifice in the single tab and the orifices in the first and second fingers of the first bearing cap; and
a second pin inserted through the orifices in the double tabs and the orifice in the third finger of the first bearing cap.

3. The assembly of claim 2, further comprising:
a second connecting rod with an outside edge of the connecting rod shaped roughly as an elongated isosceles triangle wherein the second connecting rod comprises:
a first corner adapted to couple with a second reciprocating element;

a second corner having a single tab of the predetermined width through which an orifice of the predetermined diameter is defined; and a third corner having double tabs each defining an orifice of the predetermined diameter, wherein the double tabs are separated by a gap of the predetermined width and the second connecting rod is placed over the first bearing shell portion with the single tab of the second connecting rod meshing with the first and second fingers of the second bearing cap and the third finger of the second bearing cap meshing with the double tabs of the second connecting rod;

the assembly further comprising:

a third pin inserted through the orifice in the single tab of the second connecting rod and the orifices in the first and second fingers of the second bearing cap; and a fourth pin inserted through the orifices in the double tabs of the second connecting rod and the orifice in the third finger of the second bearing cap.

4. The assembly of claim 2 wherein the first pin has a radial groove proximate an end of the first pin and the second pin each has a radial groove proximate an end of the second pin, further comprising:

a first snap ring coupled to the groove in the first pin; and a second snap ring coupled to the groove in the second pin.

5. The assembly of claim 2, further comprising:

a snap ring inserted into an annular groove defined in the second finger;

a snap ring inserted into an annular groove defined in the third finger;

a snap ring inserted in an annular groove defined into a first of the double tabs; and a snap ring inserted into an annular groove defined in a second of the double tabs.

6. The assembly of claim 2, further comprising:

a counterbore of a counterbore diameter collinear with the orifice in the second finger;

a snap ring inserted into an annular groove defined in the second finger;

a counterbore of the counterbore diameter collinear with the orifice in one of the double tabs; and a snap ring inserted into an annular groove defined in the one of the double tabs wherein a body of the first and second pins is of the predetermined diameter and a head of the first and second pins is of the counterbore diameter.

7. The assembly of claim 1, further comprising:

first and second through-hole orifices defined in the first bearing shell portion near an end of the first bearing shell portion;

first and second threaded orifices defined in the second bearing shell portion near an end of the second bearing shell portion;

a first screw inserted through the first through-hole orifice of the first bearing shell portion and threads of the first screw engaged with the first threaded orifice of the second bearing shell portion; and a second screw inserted through the second through-hole orifice of the first bearing shell portion and threads of the second screw engaged with the second threaded orifice of the second bearing shell portion.

8. The assembly of claim 1 wherein the first bearing shell portion and the second bearing shell portion have fingers extending outwardly from at least one end of each the first and second bearing shell portions; an orifice is defined in the fingers with an axis of the orifice being substantially parallel to a central axis of the journal; and the fingers of the first and second bearing shell portions are enmeshed to form a box joint, the assembly further comprising:

a dowel pin inserted through the orifices in the enmeshed fingers.

9. The assembly of claim 1 wherein:

the first bearing cap has a cylindrical concave surface and a pin extending radially from the cylindrical concave surface;

the first bearing shell portion has a cylindrical convex surface having an aperture defined in the cylindrical convex surface; and the pin engages with the aperture.

10. The assembly of claim 9 wherein the aperture is substantially evenly spaced between the ends of the first bearing shell portion and the aperture comprises a groove extending less than 30 degrees of the circumference of the first bearing shell portion.

11. The assembly of claim 9 wherein:

the second bearing cap has a cylindrical concave surface and a pin extending radially from the cylindrical concave surface;

the second bearing shell portion has a groove defined in a cylindrical convex surface associated with the second bearing shell portion, the groove associated with the second bearing shell portion extends less than the circumference of the second bearing shell portion; and the pin associated with the second bearing cap engages with the groove associated with the second bearing shell portion.

12. The assembly of claim 9 wherein relative rotational motion of the first bearing shell portion with respect to the first bearing shell cap is substantially prevented by the pin engaging with the aperture.

13. The assembly of claim 1 wherein the first bearing shell portion has first and second oil holes located roughly 60 degrees from first and second ends of the first bearing shell portion, respectively; an inner surface of the first bearing shell portion has a first annular oil groove extending from the first end of the first bearing shell portion to the first oil hole; and the inner surface of the first bearing shell portion has a second annular oil groove extending from the second end of the first bearing shell portion to the second oil hole.

14. The assembly of claim 13 wherein a third oil groove defined in an outer surface of the first bearing shell portion extends between the first and second oil holes.

15. The assembly of claim 13 wherein a third oil groove is defined in a portion of the concave surface of the first bearing cap and the portion extends from first oil hole to the second oil hole of the first bearing shell portion at all relative positions of the first bearing cap with respect to the first bearing shell portion.

16. The assembly of claim 9 wherein the first bearing cap has an oil hole through the cylindrical portion.

17. The assembly of claim 16 wherein the oil hole is of a larger diameter at an end of the hole proximate the concave surface; the pin is hollow; and the hollow pin is inserted in the oil hole.

18. The assembly of claim 1, further comprising:

a threaded hole defined in each end of the first, second, and third fingers with the threaded holes being substantially parallel.

19. The assembly of claim 18, further comprising:

a first connecting rod having a rod portion, a journal connection portion, and a piston connection portion wherein the journal connection portion has two parallel flanges that are substantially perpendicular with respect to an axis of the rod portion, a first of the flanges has two through holes and a second of the flanges has a single through hole, and the journal connection portion further includes a surface facing away from the rod portion that defines a portion of a concave cylinder;
a first bolt within one of the two through holes and coupled with threads in the threaded hole defined in the first finger of the first bearing cap;
a second bolt within the other of the two through holes and coupled with threads in the threaded hole defined in the second finger of the first bearing cap; and
a third bolt within the single through hole and coupled with the threads in the threaded hole defined in the third finger of the first bearing cap.

20. The assembly of claim 1, further comprising:
a threaded hole defined in each end of the first, second, and third fingers of each of the first and the second bearing caps;
a first connecting rod having a rod portion, a journal connection portion, and a piston connection portion wherein the journal connection portion has two parallel flanges that are substantially perpendicular with respect to an axis of the rod portion, a first of the flanges has two through holes and a second of the flanges has a single through hole, and the journal connection portion further includes a surface facing away from the rod portion that defines a portion of a concave cylinder;
a first bolt within one of the two through holes of the first connecting rod and coupled with threads in the threaded hole defined in the first finger of the first bearing cap;
a second bolt within the other of the two through holes of the first connecting rod and coupled with threads in the threaded hole defined in the second finger of the first bearing cap; and
a third bolt within the single through hole of the first connecting rod and coupled with the threads in the threaded hole defined in the third finger of the first bearing cap;
a second connecting rod having a rod portion, a journal connection portion, and a piston connection portion wherein the journal connection portion has two parallel flanges that are substantially perpendicular with respect to an axis of the rod portion, a first of the flanges has two through holes and a second of the flanges has a single through hole, and the journal connection portion further includes a surface facing away from the rod portion that defines a portion of a concave cylinder;
a fourth bolt within one of the two through holes of the second connecting rod and coupled with threads in the threaded hole defined in the first finger of the second bearing cap;
a fifth bolt within the other of the two through holes in the second connecting rod and coupled with threads in the threaded hole defined in the second finger of the second bearing cap; and
a sixth bolt within the single through hole in the second connecting rod and coupled with the threads in the threaded hole defined in the third finger of the second bearing cap.

21. The assembly of claim 1, further comprising:
a first connecting rod placed over the second bearing cap; and
a second connecting rod placed over the first bearing cap wherein:
the first bearing cap has two parallel bearing surfaces facing inwardly with the two parallel bearing surfaces extending away from the ends of the cylindrical portion of the first bearing cap;
the first connecting rod has two parallel bearing surfaces facing outwardly with the bearing surfaces of the first bearing cap bearing against the bearing surfaces of the first connecting rod;
the second bearing cap has two parallel bearing surfaces facing inwardly with the two parallel bearing surfaces extending away from the ends of the cylindrical portion of the second bearing cap; and
the second connecting rod has two parallel bearing surfaces facing outwardly with the bearing surfaces of the second bearing cap bearing against the bearing surfaces of the second connecting rod.

22. The assembly of claim 1 wherein the journal is a portion of a crankshaft of an internal combustion engine in which the journal rotates.

23. The assembly of claim 1 wherein the third finger has a width as measured along an axis parallel to a central axis of the journal substantially equal to the predetermined width of the gap.

24. The assembly of claim 1 wherein a width of the first finger is approximately equal to a width of the second finger and the width of the first finger is approximately half of the width of the third finger.

25. The assembly of claim 1 wherein the journal oscillates clockwise and counterclockwise.

26. The assembly of claim 1 wherein the first, second, and third fingers are substantially parallel.

27. A method to assemble two connecting rods onto a journal of a crankshaft, the method comprising:
placing first and second portions of a bearing shell onto the journal;
placing a first bearing cap over one of the two bearing portions wherein the first bearing cap has first and second fingers extending away from a top of the first bearing cap and a third finger extending away from a bottom of the first bearing cap; and
meshing a second bearing cap with the first bearing cap, wherein the second bearing cap has first and second fingers extending away from the bottom of the second bearing cap and a third finger extending away from a top of the second bearing cap wherein the meshing comprises: the third finger of the first bearing cap sliding into a gap between the first and second fingers of the second bearing cap and the third finger of the second bearing cap sliding into a gap between the first and second fingers of the first bearing cap;
placing a first connecting rod onto an outside surface of the second bearing cap;
inserting a first bolt into a first through hole in the first connecting rod;
engaging threads in a first bolt hole in the first finger of the first bearing cap with threads of the first bolt;
inserting a second bolt into a second through hole in the first connecting rod;
engaging threads in a second bolt hole in the second finger of the first bearing cap with threads of the second bolt;
inserting a third bolt into a third through hole in the first connecting rod; and
engaging threads in a third bolt hole in the third finger of the first bearing cap with threads of the third bolt.

28. The method of claim 27, further comprising:
placing a second connecting rod onto an outside surface the first bearing cap;
inserting a fourth bolt into a first through hole in the second connecting rod;
engaging threads in a first bolt hole in the first finger of the second bearing cap with threads of the fourth bolt;

inserting a fifth bolt into a second through hole in the second connecting rod;
engaging threads in a second bolt hole in the second finger of the second bearing cap with threads of the fifth bolt;
inserting a sixth bolt into a third through hole in the second connecting rod; and
engaging threads in a third bolt hole in the third finger of the second bearing cap with threads of the sixth bolt.

29. The method of claim 27 wherein the first bearing cap has a pin extending inwardly and an outer surface of the first portion of the bearing shell defines an aperture, the method further comprising:
engaging the pin with the aperture to limit the movement of the first bearing cap with respect to the first portion of the bearing shell wherein the engaging the pin with the aperture precedes placing the second bearing cap onto the first bearing cap.

30. The method of claim 27, further comprising: affixing the first portion of the bearing shell with the second portion of the bearing shell.

31. The method of claim 30 wherein the bearing shell portions are screwed together.

32. The method of claim 27, further comprising:
placing a first connecting rod onto an outside surface of the second bearing cap wherein a first end of the first connecting rod is adapted to couple with a reciprocating element; a first corner on a second end of the first connecting rod has a single tab having an orifice; a second corner on a second end of the first connecting rod has two tabs each having an orifice, the single tab meshing with the second and third fingers of the second bearing cap; the first finger of the second bearing cap meshing with the two tabs;
inserting a first pin through the orifice in the single tab of the first connecting rod and the orifices in the second and third fingers of thefirst bearing cap; and
inserting a second pin through the orifices in the two tabs and the orifice in the first finger of the second bearing cap.

33. The method of claim 32, further comprising:
installing a first snap ring proximate the first pin; and
installing a second snap ring proximate the second pin.

34. The method of claim 32, further comprising:
placing a second connecting rod onto an outside surface of the first bearing cap wherein a first end of the second connecting rod is adapted to couple with a reciprocating element; a first corner on a second end of the second connecting rod has a single tab having an orifice; a second corner on a second end of the second connecting rod has two tabs each having an orifice, the single tab meshing with the second and third fingers of the first bearing cap; the first finger of the first bearing cap meshing with the two tabs;
inserting a third pin through the orifice in the single tab of the second connecting rod and the orifices in the second and third fingers of the second bearing cap; and
inserting a fourth pin through the orifices in the two tab of the second connecting rod and the orifice in the first finger of the second bearing cap.

35. The method of claim 32, further comprising:
installing a third snap ring proximate the third pin; and
installing a fourth snap ring proximate the fourth pin.

36. The method of claim 32 wherein as the first connecting rod is placed onto an outside surface of the first bearing cap, parallel bearing surfaces on the first connecting rod that face outwardly slide against parallel bearing surfaces on the first bearing cap that face inwardly.

37. A journal and connecting rod assembly, comprising:
a cylindrical journal;
first and second bearing portions coupled onto the journal;
a first bearing cap placed on the first bearing portion, the first bearing cap having a concave surface that mates with a convex surface of the first bearing portion; and
a second bearing cap placed on the second bearing portion, the second bearing cap having a concave surface that mates with a convex surface of the second bearing portion wherein the first bearing cap has first and second fingers extending outwardly from a first end of a cylindrical portion of the first bearing cap and a third finger extending outwardly from a second end of the cylindrical portion of the first bearing cap and the second bearing cap has first and second fingers extending outwardly from a first end of a cylindrical portion of the second bearing cap and a third finger extending outwardly from a second end of the cylindrical portion of the second bearing wherein the third finger of the first bearing cap engages with the first and second fingers of the second bearing cap and the third finger of the second bearing cap engages with the first and second fingers of the first bearing cap; and each of first, second, and third fingers of the first and second bearing caps has an orifice defined therein.

38. The assembly of claim 37, further comprising:
a first connecting rod having three orifices adapted to align with the three holes in the first, second, and third fingers of the first bearing cap; and
a second connecting rod having three orifices adapted to align with the three holes in the first, second, and third fingers of the second bearing cap.

39. The assembly of claim 38 wherein axes of the three orifices in the first and second connecting rods and axes of the holes in the first, second, and third fingers of the first and second bearing caps are substantially parallel to a central axis of the journal.

40. The assembly of claim 39 wherein the orifices are aligned with the associated holes, the assembly further comprising:
pins inserted into the aligned orifices and holes.

41. The assembly of claim 38 wherein axes of the three orifices in the first and second connecting rods and axes of the holes in the first, second, and third fingers of the first and second bearing caps are substantially perpendicular to a central axis of the journal and roughly parallel with the first second and third fingers of the associated bearing cap.

42. The assembly of claim 41 wherein the orifices are aligned with the associated hole and the holes in the bearing cap are threaded, the assembly further comprising: bolts inserted into the orifices and engaged with the threads in the holes.

43. The assembly of claim 37 wherein the first bearing portion is a first bearing shell portion and the second bearing portion is a second bearing shell portion, the assembly further comprising:
a longitudinal oil hole defined in the journal roughly parallel with an axis of rotation of the journal;
a radial oil hole defined in the journal fluidly coupling the longitudinal oil hole and a surface of the journal;
oil holes defined in the first and second bearing shell portions, the oil holes located approximately one-third of the distance between ends of the bearing shell portions;
an oil groove on a concave surface of the first bearing shell portion extending circumferentially between an oil hole and a proximate end of the first bearing shell portion;

an oil groove on a concave surface of the second bearing shell portion extending circumferentially between an oil hole and a proximate end of the second bearing shell portion;

an oil groove on a convex surface of the first bearing shell portion between oil holes; and an oil groove on a convex surface of the second bearing shell portion between oil holes.

44. The assembly of claim 37, further comprising:

a first oil orifice extending through the cylindrical portion of the first bearing cap between the concave surface and a convex surface; and a second oil orifice extending through the cylindrical portion of the second bearing cap between the concave surface and a convex surface.

45. The assembly of claim 37, further comprising:

a pin inserted into an orifice in the concave surface of the first bearing cap with the pin extending inwardly; and an aperture defined in the first bearing portion with the pin indexed with the aperture to restrict relative movement between the first bearing portion and the first bearing cap.

46. The assembly of claim 45 wherein the pin indexed with the aperture substantially prevents relative movement and the second bearing cap is unpinned.

47. The assembly of claim 45 wherein the aperture is a first groove, the assembly further comprising:

a pin inserted into an orifice in the concave surface of the second bearing cap; and a second groove defined in the second bearing portion with the pin indexed with the aperture wherein the first and second grooves extend a predetermined length on a convex surface of the first and second bearing portions so as to restrict relative movement of the first bearing portion with respect to the first bearing cap and relative movement of the second bearing portion with respect to the second bearing cap.

* * * * *